United States Patent
D'Arbonneau (10) Patent No.: US 9,108,745 B2
(45) Date of Patent: Aug. 18, 2015

(54) METHOD FOR DETECTING A FAILURE OF AT LEAST ONE SENSOR ONBOARD AN AIRCRAFT IMPLEMENTING AN ANEMO-INERTIAL LOOP, AND ASSOCIATED SYSTEM

(71) Applicant: DASSAULT AVIATION, Paris (FR)

(72) Inventor: Francois-Xavier D'Arbonneau, Le Chesnay (FR)

(73) Assignee: DASSAULT AVIATION, Paris (FR)

( * ) Notice: Subject to any disclaimer, the term of this patent is extended or adjusted under 35 U.S.C. 154(b) by 0 days.

(21) Appl. No.: 14/316,417

(22) Filed: Jun. 26, 2014

(65) Prior Publication Data

US 2015/0006019 A1    Jan. 1, 2015

(30) Foreign Application Priority Data

Jun. 28, 2013    (FR) ...................... 13 01542

(51) Int. Cl.
| | |
|---|---|
| *G05D 1/00* | (2006.01) |
| *G05D 1/08* | (2006.01) |
| *G05D 3/00* | (2006.01) |
| *B64F 5/00* | (2006.01) |

(Continued)

(52) U.S. Cl.
CPC ........... *B64F 5/0045* (2013.01); *B60R 21/0173* (2013.01); *B60R 25/04* (2013.01); *B60T 8/885* (2013.01); *G01P 5/16* (2013.01); *G01P 7/00* (2013.01); *G01P 21/025* (2013.01)

(58) Field of Classification Search
USPC ............ 340/973; 701/7–9, 14, 29.8; 244/175, 244/177, 182
See application file for complete search history.

(56) References Cited

U.S. PATENT DOCUMENTS

| | | | |
|---|---|---|---|
| 5,349,347 | A | 9/1994 | Muller |
| 5,736,955 | A * | 4/1998 | Roif ................................ 342/33 |

(Continued)

FOREIGN PATENT DOCUMENTS

| | | |
|---|---|---|
| FR | 2 840 073 A1 | 11/2003 |
| FR | 3007840 A1 * | 1/2015 |

(Continued)

OTHER PUBLICATIONS

Constrained Linear Regression for Flight Control System Failure Identification; Chandler, P.R. ; Pachter, M. ; Mears, M.; American Control Conference, 1993; Publication Year: 1993 , pp. 3141-3145.*

(Continued)

*Primary Examiner* — Cuong H Nguyen
(74) *Attorney, Agent, or Firm* — Davidson, Davidson & Kappel, LLC (57) ABSTRACT

A method for detecting a failure of at least one sensor on board an aircraft is provided. The method includes implementing an anemo-inertial loop including obtaining a computed horizontal speed, based on an integration of a measured horizontal acceleration and obtainment of a short-term anemo-inertial speed from the computed horizontal speed; developing at least one intermediate loop parameter based on a deviation between the short-term anemo-inertial speed and the anemometric speed or the airspeed; and observing a failure detection parameter obtained from an intermediate parameter of the anemo-inertial loop and determining the presence of a failure on one of the sensors of the aircraft, based on the value of the observed failure detection parameter.

17 Claims, 8 Drawing Sheets

(51) Int. Cl.
  *B60R 25/04* (2013.01)
  *B60R 21/017* (2006.01)
  *B60T 8/88* (2006.01)
  *G01P 5/16* (2006.01)
  *G01P 7/00* (2006.01)
  *G01P 21/02* (2006.01)

(56) References Cited

U.S. PATENT DOCUMENTS

| | | | |
|---|---|---|---|
| 6,205,376 | B1 | 3/2001 | Gordon |
| 6,564,628 | B1* | 5/2003 | Leblond et al. ............. 73/178 R |
| 6,885,917 | B2* | 4/2005 | Osder et al. ........................ 701/3 |
| 8,000,847 | B2* | 8/2011 | Shue ............................... 701/10 |
| 8,090,526 | B2* | 1/2012 | Marty et al. .................. 701/411 |
| 8,170,730 | B2* | 5/2012 | Shue ............................... 701/10 |
| 2003/0233175 | A1 | 12/2003 | Giraudy et al. |
| 2004/0075586 | A1* | 4/2004 | Glover ........................... 340/963 |
| 2004/0093130 | A1* | 5/2004 | Osder et al. ........................ 701/3 |
| 2006/0164260 | A1* | 7/2006 | Berthou et al. ............... 340/945 |
| 2008/0046137 | A1* | 2/2008 | Shue ............................... 701/10 |
| 2008/0306680 | A1* | 12/2008 | Marty et al. .................. 701/201 |
| 2010/0100260 | A1 | 4/2010 | McIntyre et al. |
| 2010/0286850 | A1* | 11/2010 | Collot et al. ....................... 701/7 |
| 2011/0282523 | A1* | 11/2011 | Shue ............................... 701/10 |

FOREIGN PATENT DOCUMENTS

| | | | |
|---|---|---|---|
| WO | PCT/EP03/50751 | * | 10/2005 |
| WO | PCT/EP06/68581 | * | 5/2008 |
| WO | PCT/EP08/59240 | * | 7/2010 |

OTHER PUBLICATIONS

Caglayan, A. K., et al, "Detection, Identification, and Estimation of Surface Damage/Actuator Failure for High Performance Aircraft," 1988 ACC, Atlanta, GA, Jun. 1988.*

Chandler, P. R., M. Pachter, M. Mears and S. Sheldon, "Application of System Identification Techniques to Flight Control", Conference on Control Applications, Dayton, Ohio, Sep. 1992.*

Chandler, P. R., et al, "Regression Techniques for Aircraft Parameter Identification from Noisy Measurements in Maneuvering Flight," 1992 CDC.*

Klein V. et al., "Aerodynamic Parameters of High AOA Research Vehicle (HARV) Estimates from Fight Data", NASA TM 102692, Aug. 1990.*

Utilization of blade pitch control in low wind speed for floating offshore wind turbines; Bagherieh, O. ; Nagamune, R.; American Control Conference (ACC), 2014; DOI: 10.1109/ACC.2014.6859448; Publication Year: 2014 , pp. 4354-4359.*

On the dynamics of the pitch control loop in horizontal-axis large wind turbines; Shashikanth Suryanarayanan ; Amit Dixit American Control Conference, 2005. Proceedings of the 2005; DOI: 10.1109/ACC.2005.1470037; Publication Year: 2005 , pp. 686-690 vol. 1.*

UDE-based robust control of variable-speed wind turbines; Beibei Ren ; Qing-Chang Zhong; Industrial Electronics Society, IECON 2013—39th Annual Conference of the IEEE; DOI: 10.1109/IECON.2013.6699744; Publication Year: 2013 , pp. 3818-3823.*

* cited by examiner

FIG.11

METHOD FOR DETECTING A FAILURE OF AT LEAST ONE SENSOR ONBOARD AN AIRCRAFT IMPLEMENTING AN ANEMO-INERTIAL LOOP, AND ASSOCIATED SYSTEM This claims the benefit of French Patent Application FR 13 01542, filed Jun. 28, 2013 and hereby incorporated by reference herein.

The present invention relates to a method for detecting a failure of at least one sensor on board an aircraft, including measuring a horizontal acceleration and measuring an anemometric speed or an airspeed.

Such a method is intended to be implemented in an aircraft, in order to provide failure detection information to the crew of the aircraft.

BACKGROUND

The piloting and guidance of an aircraft, whether manual or automatic, require the provision of precise information on different flight parameters, such as the altitude, airspeed, ground speed, attitude and incline of the aircraft.

The flight parameters are computed from information collected by measuring sensors.

The reliability of the information provided on the flight parameters is critical for proper progression of the flight. In fact, these parameters are used not only directly by the pilot, when the latter takes the controls of the aircraft, but also by the computers intended to control the aircraft automatically, in particular to control the fly-by-wire system, automatic pilots, or automatic guides.

SUMMARY OF THE INVENTION

It is therefore important for the crew of the aircraft to be able to determine any malfunction that may interfere with the computation of the flight parameters as quickly as possible.

One major cause of malfunctions is anomalies from the measuring sensors, which then provide erroneous information to the system.

The main sensors involved in the computation of flight parameters can be divided into two main families.

The first family relates to sensors of the "inertial" type that in particular participate in developing the ground speed. These sensors are typically the inertial units and the satellite positioning systems, such as GPS.

A second family relates to sensors of the "anemometric" type, which in particular participate in developing the airspeed. These sensors are typically probes and pressure sensors, such as static or dynamic pressure sensors, in particular such as Pitot tubes, and temperature sensors.

Incidents and accidents result directly or indirectly from anomalies on the sensors. These anomalies are for example attitude measurement errors, erroneous GPS positions, incorrect total pressure measurements.

Furthermore, the phenomenon of ice accretion of the pressure probes, the measurements of which are used as the basis for many current architectures, is involved in many events.

To detect the presence of any failures on the sensors, it is for example known to compare the data from several redundant sensors and choose the most credible data by vote.

Alternatively, the physical likelihood of the parameters, with respect to a likely range of values for each parameter, may be used.

Such detection methods have the drawback, however, of not being robust with respect to a shared failure point, for example ice accretion on all of the Pitot tubes, which leads to a set of total pressures that are coherent, likely and valid, but incorrect.

Other methods detect potential blockages by analyzing the pneumatic signal or through devices integrated into the probes. However, not all cases of failures are necessarily well characterized, in particular during ice accretion, such that the anomalies may only be partially detected or not detected at all.

To offset this problem, it is known to compare anemometric parameters with an independent index, of the inertial unit or GPS type. However, this comparison does not allow specific detection of the anomalies on specific sensors or on groups of sensors.

An object of the invention is therefore to have a simple and effective method for detecting anomalies occurring on the vertical path of the aircraft, in particular on the static and dynamic pressure sensors.

A method is provided including measuring a horizontal acceleration and measuring an anemometric speed or an airspeed. The method includes implementing an anemo-inertial loop in a computer, the loop including the following substeps:

obtaining a computed horizontal speed, based on an integration of the measured horizontal acceleration and obtainment of a short-term anemo-inertial speed from the computed horizontal speed;

developing at least one intermediate loop parameter based on a deviation between the short-term anemo-inertial speed and the anemometric speed or the airspeed;

looping on the measured horizontal acceleration, before integration, according to the value of at least one intermediate parameter;

the method further including the following steps:

observing at least one failure detection parameter obtained from an intermediate parameters of the anemo-inertial loop;

determining the presence of a failure on one of the sensors of the aircraft, based on the value of the observed failure detection parameter.

The method according to the invention may comprise one or more of the following features, considered alone or according to any technically possible combination:

the determination step includes a comparison between the value of the observed failure detection parameter and a given predetermined threshold;

the anemo-inertial loop includes computing a first intermediate parameter representative of the difference between the short-term anemo-inertial speed and the anemometric speed or the airspeed, and computing a second intermediate parameter representative of the accumulation of a deviation between the short-term anemo-inertial altitude and the anemometric speed or the airspeed over several iterations of the loop;

the loop includes the determination of an accumulation gain of each deviation between the short-term anemo-inertial speed and the anemometric speed or the airspeed, the second intermediate parameter being computed based on the accumulation gain;

the accumulation gain is a variable gain over time, the accumulation gain being computed based on the horizontal acceleration measured by the horizontal acceleration sensor and/or a vertical speed obtained by integrating a vertical acceleration measured by the vertical acceleration sensor;

a first failure detection parameter is determined from an accumulation of the deviation between the short-term anemo-inertial speed and the anemometric speed or the airspeed over several iterations of the loop, the determination of the first failure detection parameter optionally comprising a decrease in said accumulation, advantageously a reset to zero of said accumulation, when at least one condition for lack of anomaly detection is obtained for a given time interval;

the anemo-interial loop includes the determination of a third intermediate parameter, representative of the deviation between the short-term anemo-inertial speed and the anemometric speed or the airspeed, said deviation being corrected with the second intermediate parameter;

a second failure detection parameter is determined from the third intermediate parameter, while advantageously being equal to the third intermediate parameter;

the looping sub-step comprises a correction of the horizontal acceleration before integration, by at least one base correction value depending on the third intermediate parameter and at least one base correction gain variable over time, to obtain the computed horizontal speed after integration;

the base correction gain decreases during a horizontal acceleration or deceleration phase of the aircraft;

the correction of the horizontal acceleration includes weighting the horizontal acceleration measured by a variable weight gain, advantageously depending on an instantaneous altitude, in particular a short-term baro-inertial altitude obtained by a double integration of a vertical acceleration measured using a vertical acceleration sensor;

the loop includes a sub-step for correcting the computed horizontal speed, based on an instantaneous altitude to obtain the short-term anemo-inertial speed;

the sub-step for correcting the computed horizontal speed includes the development of an intermediate correction parameter as a function of an instantaneous altitude, in particular a short-term baro-inertial altitude obtained by a double integration of a vertical acceleration measured using a vertical acceleration sensor;

it includes a sub-step for time compensation of the short-term anemo-inertial speed obtained after integration, a first intermediate parameter representative of a deviation between the short-term anemo-inertial speed and the anemometric speed or airspeed being obtained from the difference between the time-compensated short-term anemo-inertial speed and the anemometric speed or the airspeed;

it includes activating an alarm when the presence of a failure is detected in the step for determining the presence of a failure;

the horizontal acceleration is measured by acceleration sensors;

the anemometric speed or the airspeed is measured based on data received from at least one pressure sensor and/or temperature sensor;

the acceleration sensors are included in an inertial unit, the step for measuring a horizontal acceleration being done by the acceleration sensors of the inertial unit, the anemo-inertial correction loop being implemented in a computer of the inertial unit;

none of said intermediate parameters are sent to a computer of a flight parameter display system in the aircraft, such as a cockpit display, and/or a computer of an automatic control and navigation system of the aircraft, such as automatic pilot.

The invention also relates to a system for detecting a failure of least one sensor on board an aircraft, including:
an assembly for measuring components of a horizontal acceleration;
an assembly for measuring an anemometric speed or an airspeed;
a computer;
wherein the computer includes an assembly for implementing an anemo-inertial loop including:
a module for obtaining a computed horizontal speed, based on an integration of the horizontal acceleration measured by the assembly for measuring components of a horizontal acceleration and for obtaining a short-term anemo-inertial speed obtained from the computed horizontal speed;
a module for developing at least one intermediate loop parameter based on a deviation between the short-term anemo-inertial speed and the anemometric speed or the airspeed;
a module for looping on the measured horizontal acceleration, before integration, based on the value of at least one intermediate parameter;
the system including:
an assembly for observing at least one failure detection parameter obtained from an intermediate parameter of the anemo-inertial loop,
an assembly for determining the presence of a failure on one of the sensors of the aircraft, based on the value of the observed failure detection parameter.

The system according to the invention may comprise one or more of the following features, considered alone or according to any technically possible combination:
the assembly for measuring components of a horizontal acceleration comprises acceleration sensors;
the assembly for measuring an anemometric speed comprises at least one pressure sensor and/or temperature sensor;
the implementing assembly includes a module for correcting the computed horizontal speed, according to an instantaneous altitude to obtain a short-term anemo-inertial speed.

BRIEF SUMMARY OF THE DRAWINGS

The invention will be better understood upon reading the following description, provided solely as an example, and done in reference to the appended drawings, in which.

DETAILED DESCRIPTION

Figure 1:
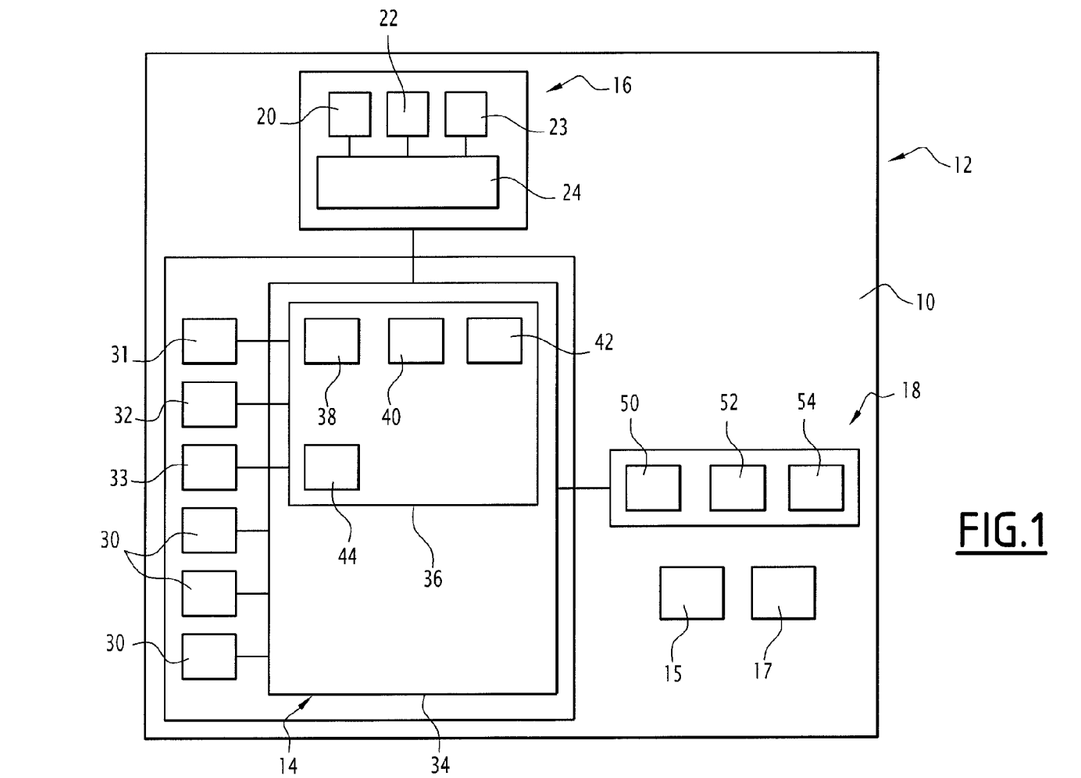
FIG. 1 is a view of a diagram diagrammatically illustrating a first detection system for implementing a method according to an embodiment of the invention.

A first failure detection method according to an embodiment of the invention is implemented using a detection system 10, shown diagrammatically in FIG. 1.

The system 10 is positioned in a civilian or military aircraft 12, provided with an inertial unit 14 capable of measuring at least one horizontal acceleration, a flight data display system 15, connected to the inertial unit 14, and an automatic control system 17 of the aircraft.

As illustrated by FIG. 1, the system 10 includes the inertial unit 14, an assembly 16 for measuring an anemometric speed distinct from the speed determined by the inertial unit 14, and, according to an embodiment of the invention, a failure detection element 18, connected to the inertial unit 14.

The inertial unit 14 is one advantageous means for carrying out the embodiment of the invention. Alternatively, any device capable of providing a horizontal acceleration is suitable.

The measuring assembly 16 includes at least one sensor 20 for measuring a static pressure Ps, at least one sensor 22 for measuring a total pressure Pt, and advantageously, at least one sensor 23 for measuring a total temperature Tt.

It includes an assembly 24 for processing data coming from sensors 20, 22, 23, capable of computing at least one anemometric speed Vc, and/or an airspeed Va independent of the speed provided by the inertial unit 14.

The anemometric speed is for example the conventional speed Vc, computed from a difference between the total pressure Pt measured by the sensor 22 and the static pressure Ps measured by the sensor 20, and from development constants such as the speed A0 of sound in the air at sea level and the adiabatic coefficient γ of the air.

The airspeed Va is computed from a difference between the total pressure measured by the sensor 22 and the static pressure measured by the sensor 20, from a total temperature Tt measured by the sensor 23 in order to obtain a static temperature Ts and from development constants such as the speed of sound a0 in the air at sea level and the adiabatic coefficient γ of the air.

In a known manner, the inertial unit 14 includes a plurality of sensors 30 to 33 of metrological precision, and a computer 34 connected to the sensors 30 to 33, capable of exploiting the data from the sensors 30 to 33 to provide position, speed and attitude parameters usable by the pilot of the aircraft.

Among the sensors 30 to 33, the inertial unit 14 in particular includes several rate gyros 30, for example three. The rate gyros 30 provide angular speed of rotation values around axes, in order each to determine a component of the angular speed vector (in particular pitch, roll, or yaw speed).

The inertial unit 14 further includes several accelerometers 31, 32, 33, for example three, providing representative acceleration values along the axes of the aircraft 12.

At least one accelerometer 32 is capable of measuring a value representative of a vertical acceleration AccZ of the aircraft, considered along a geographical vertical axis.

At least two accelerometers 33 are each respectively capable of measuring a component of a horizontal acceleration AccX of the aircraft, considered in a horizontal geographical plane to obtain the value of a horizontal acceleration AccX.

In general, the computer 34 of the inertial unit 14 is capable of determining, at successive moments t, at a given frequency for example comprised between 1 Hz and 100 Hz, numerical geographical position (latitude, longitude, altitude), geographical speed, and attitude data of the aircraft in heading, roll and pitch, from information provided by the accelerometers 31, 32, 33 and the rate gyros 30.

Among the functionalities of the computer 34, the latter includes a software assembly 36 for implementing an anemo-inertial loop, based on the horizontal acceleration AccX measured using acceleration sensors 33, and a correction based on the anemometric speed from the measuring assembly 16.

Figure 4:
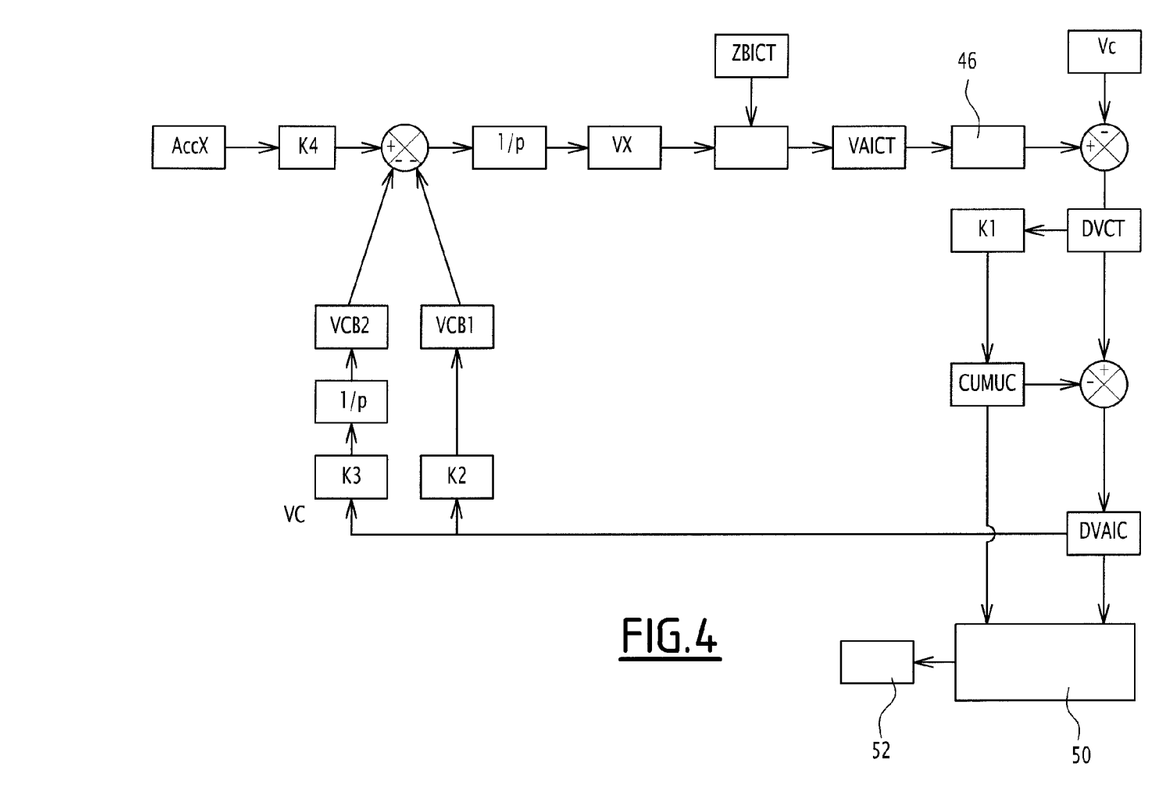
FIG. 4 is a diagram illustrating the failure detection principle implemented by the method according to the embodiment of the invention.

In reference to FIGS. 1 and 4, to implement the anemo-inertial loop, the implementing assembly 36 includes a software module 38 for obtaining a computed horizontal speed Vx, based on an integration of the horizontal acceleration AccX obtained from the acceleration sensor 33.

The assembly 36 further includes a software module 40 for correcting the computed horizontal speed Vx, according to an instantaneous altitude ZBICT advantageously determined using a baro-inertial loop implemented in the computer 34, to obtain a short-term anemo-inertial speed VAICT.

The assembly 36 further includes a software module 42 for developing at least one intermediate parameter DVCT, CUMUC, DVAIC based on a deviation between the short-term anemo-inertial speed VAICT and the anemometric speed Vc or the airspeed Va.

The assembly 36 also includes a software module 44 for correcting the measured horizontal acceleration AccX, before integration, based on the value of at least one intermediate parameter DVAIC and a plurality of variable gains K2 to K4, computed by a gain determination loop.

As will be seen below, the module 40 for correcting the computed horizontal speed Vx is capable of developing an intermediate correction parameter VZP dependent on an instantaneous altitude, to compensate the variations of the anemometric speed related to the variations of the instantaneous altitude.

In this example, the module 42 is capable of computing, at each moment t, a first intermediate parameter DVCT made up of a difference between a time-compensated short-term anemo-inertial speed VAICT and the anemometric speed Vc or the airspeed Va, then developing a second intermediate parameter CUMUC representative of the accumulation over time of the difference DVCT, based on a variable accumulation gain K1, computed by the gain determination loop.

To that end, the module 42 includes a software compensator 46, capable of processing the short-term anemo-inertial speed VAICT obtained at each moment t by the module 38, to calibrate it temporally with the anemometric speed Vc or the airspeed Va measured by the measuring assembly 16.

The module 42 is further capable of developing, at each moment t, a third intermediate parameter DVAIC, representative of a deviation between the short-term anemo-inertial speed VAICT and the anemometric speed Vc or the airspeed Va, corrected using the second intermediate parameter CUMUC.

The module 44 for correcting the measured horizontal acceleration AccX before integration is capable of applying a variable weight gain K4 to the horizontal acceleration AccX measured using the sensor 33.

The module 44 is further capable of developing at least one base correction value VCB1, VCB2 designed to be applied to the weighted measured horizontal acceleration AccX, based on at least one intermediate parameter DVAIC, and at least one variable correction gain K2, K3.

In reference to FIG. 1 and according to the embodiment of the invention, the failure detection element 18 includes an assembly 50 for developing and observing at least one failure detection parameter CUMUC, DVAIC, coming from at least one intermediate parameter DVCT, CUMUC, DVAIC computed in the anemo-inertial loop by the implementing assembly 36.

The element 18 further includes an assembly 52 for determining the presence of a failure on at least one of the sensors 33, 20 to 23 of the aircraft 12, based on the value of at least one observed failure detection parameter CUMUC, DVAIC, and advantageously, an assembly 54 for activating an alarm when the failure is detected by the determination assembly 52.

A first failure detection method according to the embodiment of the invention will now be described.

Figure 2:
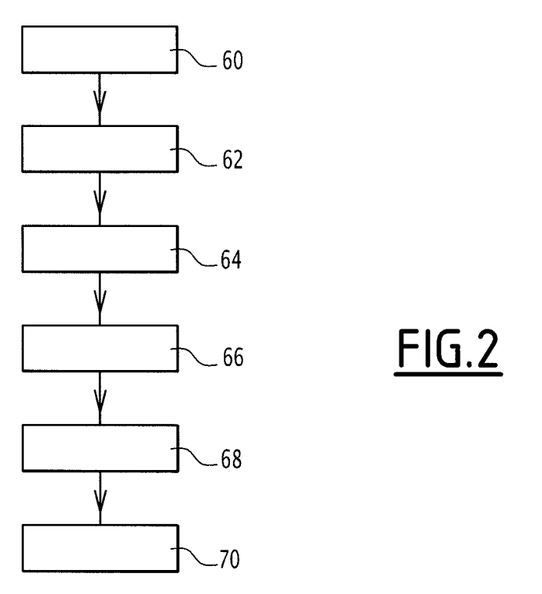
FIG. 2 is a functional block diagram of the steps of the method according to the embodiment of the invention.

As illustrated by FIGS. 2 and 4, this method includes a step 60 for measuring, at each moment t, a horizontal acceleration AccX using an acceleration sensor 33 of the inertial unit 14, and a step 62 for measuring, at each moment, an anemometric speed Vc or the airspeed Va, based on data received from at least one sensor 20, 22, 23 of the measuring assembly 16.

In this example, the step 62 is implemented from data received from the static and total pressure sensors 20, 22 and optionally, from a total temperature sensor 23.

The method further includes a step 64 for implementing the anemo-inertial loop using the implementing assembly 36 present in the computer 34.

The method further includes a step 66 for developing and observing at least one failure detection parameter CUMUC, DVAIC, obtained using at least one intermediate parameter DVCT, CUMUC, DVAIC developed in the memo-inertial loop, and a step 68 for determining the presence of a failure based on the value of at least one observed failure detection parameter CUMUC, DVAIC.

When a failure is in fact observed, the method advantageously includes a step 70 for activating an alarm.

In step 60, a horizontal acceleration AccX is measured by the horizontal acceleration sensors 33 at successive moments t1, for example at a frequency comprised between 1 Hz and 100 Hz. This horizontal acceleration AccX represents the horizontal component of the acceleration of the aircraft in the geographical reference.

Simultaneously, a vertical acceleration AccZ is measured by the vertical acceleration sensor 32 at successive moments t1, for example at a frequency comprised between 1 Hz and 100 Hz. This vertical acceleration AccZ is compensated for the Coriolis acceleration and gravity.

Likewise, in step 62, an anemometric speed Vc and/or an airspeed Va is developed by the assembly 24, at successive moments t2, for example a frequency comprised between 1 Hz and 100 Hz, from measurements from the static 20 and total 22 pressure sensors.

The anemometric speed used in the inventive method is advantageously the conventional speed Vc. The conventional speed Vc is computed from a difference between the total pressure Pt measured by the sensor 22 and the static pressure Ps measured by the sensor 20, and from development constants such as the speed a0 of sound in the air at sea level and the adiabatic coefficient γ of the air.

Alternatively, the assembly 24 further uses the total temperature sensor 23 to compute the airspeed Va. This airspeed Va is computed from a difference between the total pressure Pt measured by the sensor 22 and the static pressure Ps measured by the sensor 20, from a total temperature Tt, measured by the sensor 23, making it possible to obtain a static temperature Ts and from development constants such as the speed a0 of sound in the air at sea level and the adiabatic coefficient γ of the air.

Figure 3:
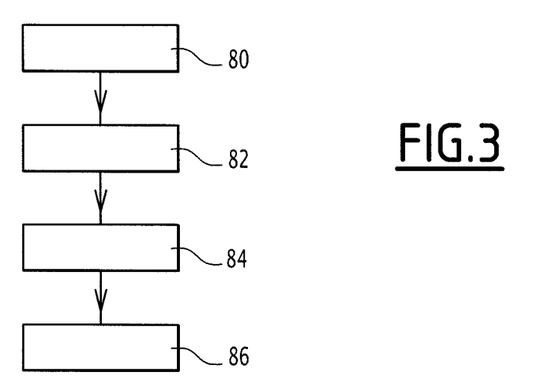
FIG. 3 is a functional block diagram of sub-steps of the anemo-inertial loop implemented in the method according to the embodiment of the invention.

FIG. 3 illustrates the different sub-steps 80 to 86 of the step 66 for implementing the anemo-inertial loop using the implementing assembly 36 of the computer 34. The different sub-steps 80 to 86 are repeated upon each iteration of the loop.

During the sub-step 80, and as illustrated in FIG. 4, a computed horizontal speed Vx is obtained by the module 38 based on an integration of the vertical acceleration AccX measured in step 60 at each moment t1.

To that end, the measured horizontal acceleration AccX is first weighted by applying a weighting gain K4 to it computed during a correction step 86 of the preceding iteration. The weighted horizontal acceleration AccX is next corrected by at least one base correction value VCB1, VCB2 developed during a correction step 86 of the preceding iteration.

The corrected acceleration is next integrated to obtain a computed horizontal speed Vx.

During the sub-step 82, the computed horizontal speed VX is corrected by the module 40 to make it comparable to or homogenous with the anemometric speed Vc or the airspeed Va determined from the sensors 20 to 23 of the measuring assembly 16.

In fact, the anemometric speed Vc or the airspeed Va is generally a nonlinear function of the difference between the total pressure and the static pressure. The correction step results in compensating the variations of the anemometric speed Vc or the airspeed Va related to the variations of the static pressure Ps to keep only the variations related to the horizontal accelerations and decelerations.

To that end, the sub-step 82 includes the development of an intermediate correction parameter VZP determined according to an instantaneous altitude ZBICT of the aircraft 12, and at least one intermediate gain G1, G2.

Advantageously, the instantaneous altitude is a short-term baro-inertial altitude ZBICT obtained through a double integration of the vertical acceleration AccZ measured using the vertical acceleration sensor 32.

Preferably, the vertical acceleration AccZ, before integration, and the computed vertical speed VZ, after integration, are corrected in the context of a baro-inertial loop implementing a pressure altitude Zp obtained by the measuring assembly 16 using data from the static pressure sensor 20.

The correction is based on the computation of a deviation between the short-term baro-inertial altitude ZBICT and the reference altitude Zp, to determine at least one intermediate loop parameter DZBIC, and on the computation of at least one correction value of the vertical acceleration AccZ, before integration, and at least one correction value of the computed vertical speed VZ, after integration, from the intermediate loop parameter DZBIC and a plurality of variable correction gains.

One example of a baro-inertial loop is described in the French application by the Applicant no 130543, and the title of which is "Method for detecting a failure of at least one sensor onboard an aircraft implementing a baro-inertial loop, and associated system".

Preferably, the intermediate correction parameter VZP is computed according to the difference between the instantaneous altitude ZBICT obtained at each moment and an initialization altitude ZBICT0, corresponding to the value of the instantaneous altitude at an initialization moment of the amino-inertial loop.

Advantageously, the first intermediate correction parameter VZP is computed from a first intermediate gain G1 that depends on an inertial estimate of the anemometric speed Vc or the airspeed Va, and from a second intermediate gain G2 that depends on the instantaneous altitude ZBICT.

In particular, the inertial estimate of the anemometric speed Vc or the airspeed Va consists of the horizontal speed VX computed during the sub-step 80. The first intermediate gain G1 is for example an affine function of the inertial estimate.

The second intermediate gain G2 is for example an affine function of the instantaneous altitude, in particular the short-term baro-inertial altitude ZBICT.

The coefficients of the aforementioned affine functions advantageously vary according to the considered altitude range.

For example, if the instantaneous altitude is below the limit of the tropopause, beyond which the static temperature Ts becomes constant, that limit generally being situated around 11,000 m of altitude, a set of coefficients is used to define each affine function. If the instantaneous altitude is above the limit of the tropopause, a second set of coefficients, different from the first set, is used.

To compute the intermediate correction parameter VZP, the following equation is advantageously used:

$$VZP = G1(VX) \times G2(ZBICT) \times (ZBICT - ZBICT0) - \text{delta}Z,$$

in which deltaZ is a constant intended to ensure the continuity between the two functions on passing through the tropopause.

The use of the short-term baro-inertial altitude ZBICT as the instantaneous altitude is particularly advantageous to implement the correction on the computed horizontal speed, since that altitude constitutes a relatively precise estimate taking into account the differences between the real atmosphere on the day and the standard atmosphere. This makes it possible to compensate the deviation present between the real atmosphere and the standard atmosphere, which affects the value of the anemometric speed.

Alternatively, a pressure altitude ZP, a geographical altitude, or more generally any altitude, may be used directly as the instantaneous altitude.

One example embodiment of VZP may be as follows (with VX in knots and ZBICT in meters):

if ZBICT<11000 m, $$VZP = (0.0017 \times (VX - 400) + 0.785) \times (-8.5 \times 10^{-6} \times ZBICT + 1) \times (0.0111 \times (ZBICT - ZBICT0))$$

if ZBICT>11000 m, $$VZP = (0.0017 \times (VX - 400) + 0.785) \times (-2 \times 10^{-5} \times ZBICT + 1) \times (0.0161 \times (ZBICT - ZBICT0)) - \text{delta}Z.$$

Then, the short-term anemo-inertial speed VAICT is computed by the module 40 from the computed horizontal speed VX, and from the intermediate correction parameter VZP, for example by obtaining the difference VX-VZP between those parameters.

During step 82, and as illustrated in FIG. 4, at least one intermediate parameter, advantageously three intermediate parameters DVCT, CUMUC, DVAIC, are developed by the module 42, based on the deviation between the short-term anemo-inertial speed ZBICT and the measured anemometric speed Vc or the measured airspeed Va.

To that end, a first intermediate parameter, namely a temporally compensated difference DVCT, is computed based on a short-term anemo-inertial speed VAICT, and the measured anemometric speed Vc or the measured airspeed Va.

A temporal compensator 46 is used to recalibrate the computed value of the short-term anemo-inertial speed VAICT resulting from the measurement of the horizontal acceleration AccX at a moment t1, with a measured anemometric speed Vc or a measured airspeed Va resulting from the measurement done by the sensors 20 to 23 at the same moment t1.

This compensation makes it possible to correct the anemometric delays, and in particular any offset between the time needed to perform the integration of the horizontal acceleration AccX obtained from the measurement from the sensor 33 followed by the associate correction, and the time necessary to develop the anemometric speed Vc or the airspeed Va from the measurement by the sensors 20 to 23.

This makes it possible to create a time-compensated short-term anemo-inertial speed.

The difference DVCT between the time-compensated short-term anemo-inertial speed and the anemometric speed Vc or the airspeed Va is next determined.

This difference DVCT constitutes the first intermediate parameter.

Then, the second intermediate parameter CUMUC is determined. As will be seen below, the second intermediate parameter CUMUC here is representative of the weighted accumulation of the successive differences DVCT between the time-compensated short-term anemo-inertial speed VAICT and the anemometric speed Vc or the airspeed Va.

For the weighting, a variable accumulation gain K1 is applied to each difference DVCT to obtain a weighted difference.

As will be seen below, the variable gain K1 is advantageously zero when level and evolves when the horizontal acceleration AccX or the vertical speed VZ determined from the sensors 33, 32 are non-zero.

The weighted difference is added to the accumulation of the weighted differences obtained during the preceding iterations, to obtain the second intermediate parameter CUMUC.

The second intermediate parameter CUMUC is thus representative of the accumulation of the weighted deviations between the time-compensated short-term anemo-inertial speed VAICT and the measured anemometric speed Vc or the measured airspeed Va.

The third intermediate parameter DVAIC is computed from the difference DVCT and the second intermediate parameter CUMUC.

In particular, DVAIC is equal to the difference DVCT-CUMUC.

Then, during the correction sub-step 86, a variable weight gain K4 is computed to be applied to the measured horizontal acceleration AccX, in order to obtain a weighted horizontal acceleration.

This gain makes it possible to adjust the effect of the horizontal acceleration AccX according to the altitude, to account for the fact that the horizontal acceleration of the aircraft 12 does not have the same effect on the anemometric speed Vc or on the airspeed Va according to the altitude.

Preferably, the weight gain K4 decreases when the altitude increases. It is advantageously close to 1 when the altitude is zero, when the conventional speed Vc is close to the airspeed Va.

Advantageously, the weight gain K4 depends on the short-term baro-inertial altitude ZBICT obtained through a double integration of the vertical acceleration AccZ measured using the vertical acceleration sensor 32, and corrected in the baro-inertial loop of the computer 34 of the inertial unit 14.

Alternatively, a simple pressure altitude Zp is used.

In one example embodiment, the weight gain K4 is computed using the following equation:

$$K4 = ZBICT \times (0.83 - 0.995)/15\,000 + 0.995.$$

Next, at least one base correction value VCB1, VCB2 of the horizontal acceleration AccX is computed by the module 44 based on the third intermediate parameter DVAIC.

In the example shown in FIG. 4, a first base variable correction gain K2 is applied to the third intermediate parameter DVAIC to constitute a first intermediate correction value VCB1 applied to the horizontal acceleration AccX before integration.

In particular, VCB1 is equal to the product K2×DVAIC.

Furthermore, a second base correction variable gain K3 is applied to the third intermediate parameter DVAIC. The obtained value is next integrated to constitute a second intermediate correction value VCB2 applied to the weighted horizontal acceleration, before integration of the acceleration.

In particular, VCB2 is equal to the integrated value of K3×DVAIC and the corrected AccX is equal to (K4×AccX)−VCB1−VCB2.

The variable gains K1 to K3 are computed by a gain determination loop, for example shown in FIGS. 5 to 9.

Figure 5:
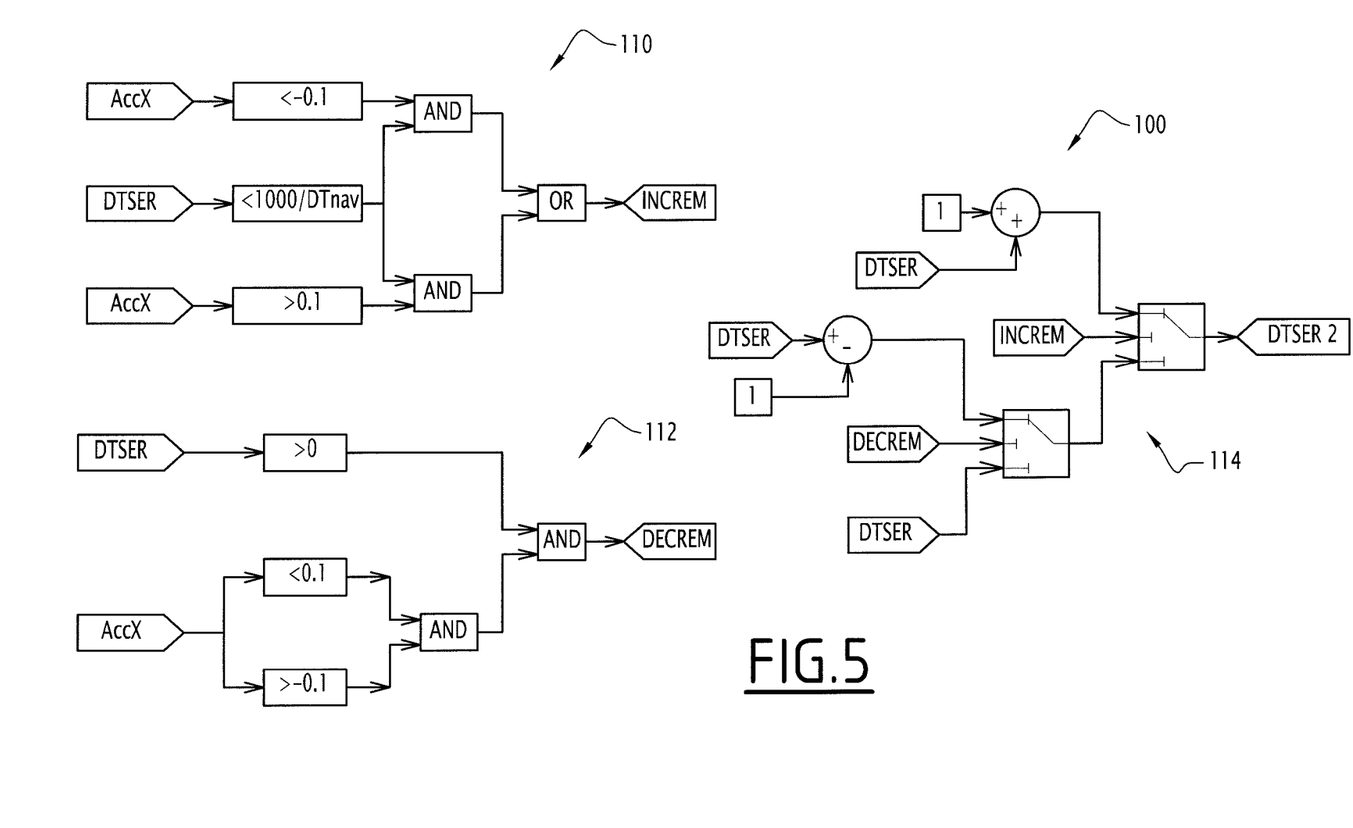
FIGS. 5 to 9 illustrate an example of a loop for computing variable gains implemented in the method according to the embodiment of the invention.
Figure 6:
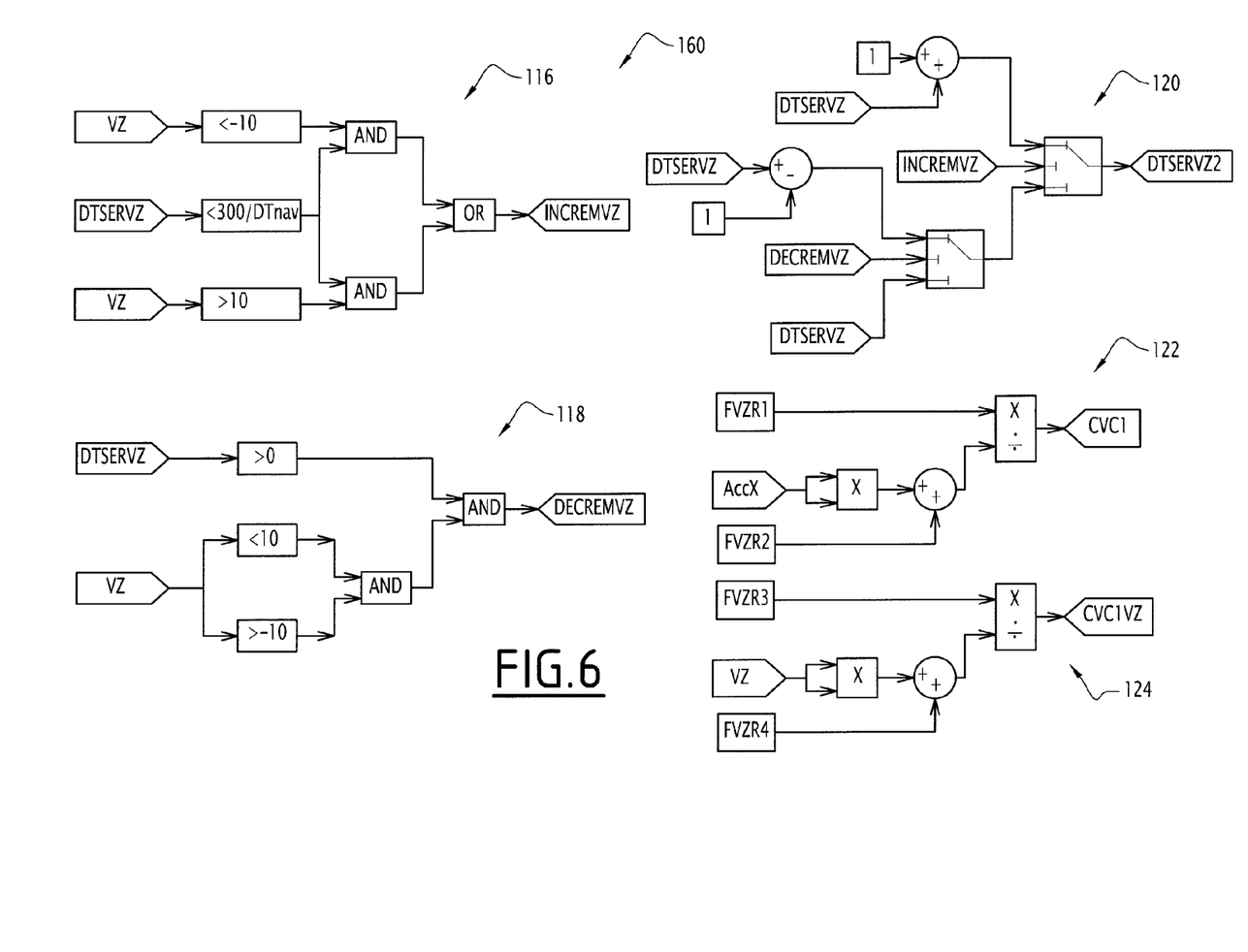
Figure 7:
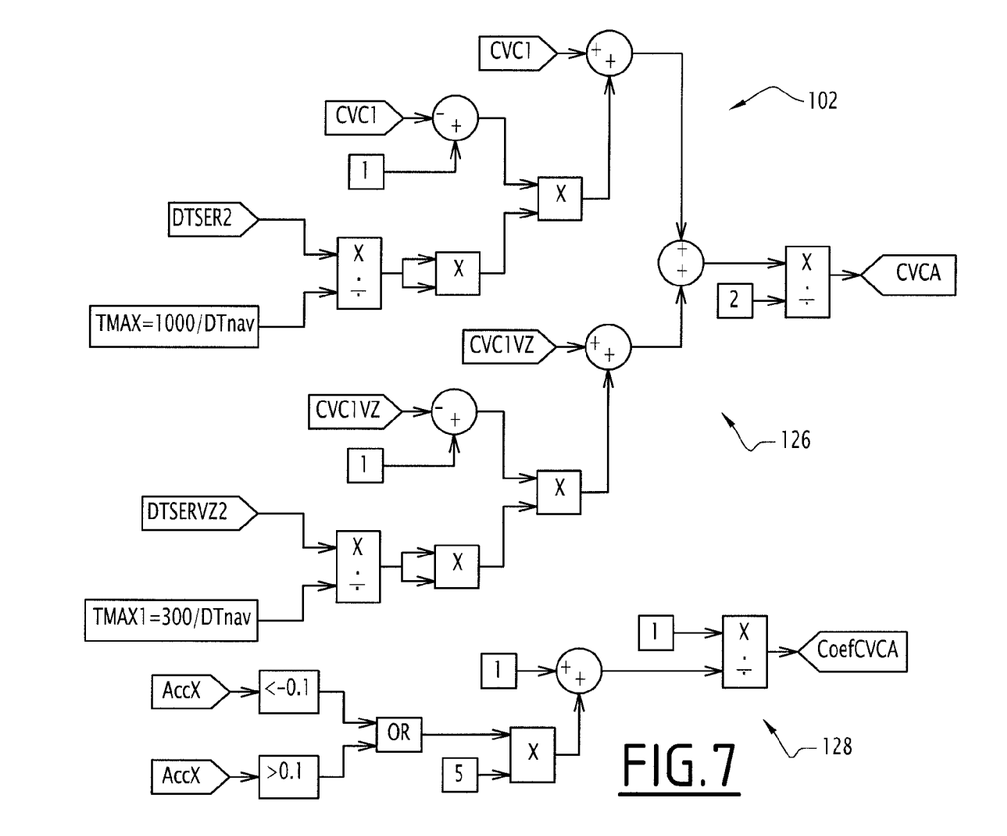

The gain determination loop includes, for each iteration, an initialization phase, a phase 100 for computing a first set of intermediate values DTSER2, DTSERVZ2, CVC1, CVC1VZ, illustrated by FIGS. 5 and 6, then a phase for computing a set of adjustment variables for the gains CVCA, coeffCVCA, illustrated by FIG. 7. The loop next includes a phase 104 for computing variable gains K1 to K3, based on adjustment variables of the gains CVCA, coeffCVCA, illustrated by FIG. 8, and a looping phase 105, illustrated by FIG. 9.

During the initialization phase, the values of the horizontal acceleration AccX and the vertical speed Vz computed by integration of the vertical acceleration AccZ obtained during step 60 are reported.

Figure 9:
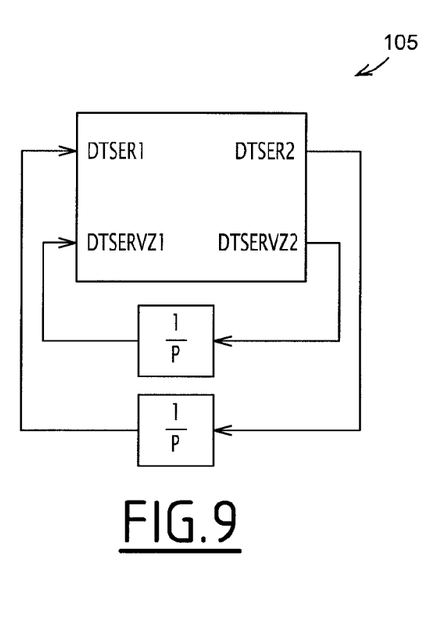

Starting variables DTSER, DTESRVZ are respectively initialized from intermediate variables DTSER2, DTSERVZ2 obtained during a preceding iteration, by integrating those intermediate variables DTSER2, DTSERVZ2, as illustrated in FIG. 9 during the phase 105.

During the phase 100, a first intermediate variable DTSER2 is computed from the horizontal acceleration AccX, and from a first starting variable DTSER, as illustrated in diagrams 110 to 114 in FIG. 5.

To that end, a first increment INCREM is obtained in diagram 110, when the absolute value of the horizontal acceleration AccX exceeds a given threshold, here $0.1 \, \text{m·s}^{-2}$, combined with the first starting variable DTSER below a given constant, here equal to 1000/DTnav, where DTnav is a time constant.

On the contrary, a first decrement DECREM is obtained in diagram 112 when the absolute value of the vertical acceleration AccX is below the given threshold, and the value of the first starting variable DTSER is positive.

The first intermediate variable DTSER2 is next computed according to diagram 114, based on DTSER and any increment INCREM or decrement DECREM computed according to diagrams 112 and 114.

For each of the boxes driven by the switches INCREM or DECREM in diagram 114 of FIG. 5, when the value of the switch is above a given constant, for example equal to 0.5, the output is equivalent to the value situated at the upper input of the box, whereas otherwise, the output is equivalent to the value situated at the lower input of the box.

In the present case, depending on the values of DECREM and INCREM, DTSER2 is equivalent to DTSER, DTSER+1 or DTSER−1

A second intermediate variable DTSERVZ2 is computed from the vertical speed Vz and from a second starting variable DTSERVZ, as illustrated in diagrams 116 to 120 in FIG. 6.

To that end, a second increment INCREMVZ is obtained in diagram 116, when the absolute value of the vertical speed Vz is above a given threshold, here 10 m/s, combined with a value of the second starting variable DTSERVZ below a given constant 300/DTnav.

On the contrary, a second decrement DECREMVZ is obtained in the diagram 118 when the absolute value of the vertical speed Vz is below the given threshold, and the value of the second starting variable DTSERVZ is positive.

The value of the second intermediate variable DTSERVZ2 is next computed according to diagram 120, based on the second starting variable DTSERVZ and any increment INCREMVZ or decrement DECREMVZ computed according to diagrams 116 and 118.

For each of the boxes controlled by the switches INCREMVZ or DECREMVZ in diagram 120 of FIG. 6, when the value of the switch is higher than a given constant, for example equal to 0.5, the output is equivalent to the value situated at the upper input of the box, whereas otherwise, the output is equivalent to the value situated at the lower input of the box.

In the present case, depending on the values of DECREMVZ and INCREMVZ, DTSERVZ2 is equivalent to DTSERVZ, DTSERVZ+1 or DTSERVZ−1.

Next, in reference to FIG. 6, a third intermediate variable CVC1 is computed by the diagram 122, based on the measured horizontal acceleration AccX and constants FVZR1, FVZR2.

In this specific example, the square of the measured horizontal acceleration AccX is computed, then the sum of that square with the constant FVZR2 is done.

The ratio of the constant FVZR1 to the obtained sum constitutes the third intermediate variable CVC1.

Next, a fourth intermediate variable CVC1VZ is computed by the diagram 124, based on the vertical speed Vz obtained from the measured vertical acceleration AccZ and constants FVZR3, FVZR4.

In this specific example, the square of the vertical speed Vz is computed, then the sum of that square with the constant FVZR4 is done.

The ratio of the constant FVZR3 to the sum obtained constitutes the fourth intermediate variable CVC1VZ.

In reference to FIG. 7, during the phase 102, the adjustment variables for the gains CVCA, coeffCVCA are computed from intermediate variables DTSER2, DTSERVZ2, CVC1, CVC1VZ and constants, respectively by diagrams 126 and 128.

In diagram 126, a first adjustment variable of the gains CVCA is computed, without taking the measured horizontal acceleration AccX into account, from intermediate variables DTSER2, DTSERVZ2, CVC1, CVC1VZ.

M the example of FIG. 7, the first intermediate variable DTSER2 is divided by a constant Tmax, then the square of the obtained ratio is computed. This square is multiplied with the difference between the constant, here equal to 1, and the third intermediate variable CVC1, before again adding the third intermediate variable CVC1, to obtain a first sum.

The second intermediate variable DTSERVZ2 is divided by a constant Tmax1, then the square of the obtained ratio is computed. This square is multiplied with the difference between a constant, here equal to 1, and the fourth intermediate variable CVC1VZ, before again adding the fourth intermediate variable CVC1VZ, to obtain a second sum.

The first sum and the second sum are added, then divided by a constant, here equal to two, to obtain the first adjustment variable for the gains CVCA.

As specified above, the second adjustment variable for the gains coeffCVCA assumes a value different from 1, only when the absolute value of the horizontal acceleration exceeds a given threshold, here equal to 0.1 m·2$^{-2}$.

In the example of FIG. 7, when this condition is met, the horizontal acceleration AccX is multiplied by a constant, here equal to 5, a constant here equal to 1 being added to the obtained product, yielding an intermediate result.

The ratio of a constant, here equal to 1, to the intermediate result yields the second adjustment variable for the gains coeffCVCAC.

Figure 8:
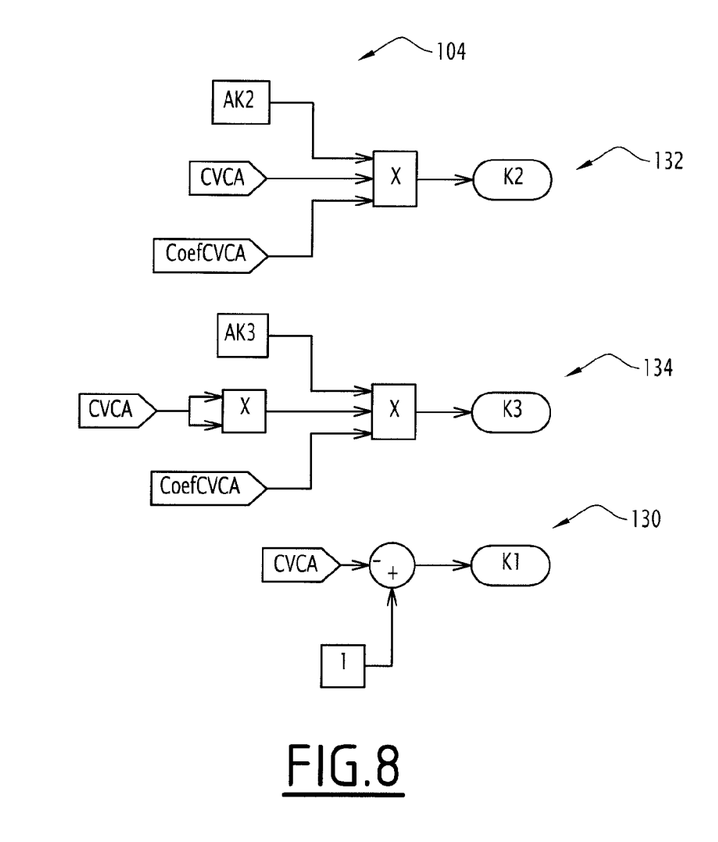

Next, during the phase 104, illustrated by FIG. 8, the variable gains K1 to K3 are computed based on adjustment variables of the gains CVCA, coeffCVCA, and constants AK2, AK3, by the respective diagrams 130, 132, 134.

The accumulation gain K1 here is computed as a function of the first adjustment variable of the gains CVCA, without involving the second adjustment variable of the gains coeffCVCAC, in diagram 130.

In this example, the accumulation gain K1 is equal to the difference between a constant, here equal to 1, and the first adjustment variable of the gains CVCA.

The first base correction gain K2 is computed here as a function of the first adjustment variable of the gains CVCA, and the second adjustment variable of the gains coeffCVCAC, in diagram 132.

In this example, the first base correction gain K2 is equal to the product of a constant AK2, the first adjustment variable of the gains CVCA, and the second adjustment variable of the gains coeffCVCAC.

The second base correction gain K3 here is computed as a function of the first adjustment variable of the gains CVCA, and the second adjustment variable of the gains coeffCVCAC, in the diagram 134.

In this example, the second base correction gain K3 is equal to the product of a constant AK3, the square of the first adjustment variable of the gains CVCA, and the second adjustment variable of the gains coeffCVCAC.

In one embodiment, DTnav is equal to 50, AK2 is equal to 3×10$^{-2}$, and AK3 is equal to 3×10$^{-4}$.

The maximum value of the first base correction gain K2 and the second base correction gain K3 is decreased during acceleration and deceleration phases using the second adjustment variable of the gains coeffCVCAC.

Next, as illustrated by FIG. 9, during the phase 105, looping is done by integrating the values of the first and second intermediate parameters DTSER2, DTSERVZ2, in order to obtain the new values of starting parameters DTSER, DTSERVZ, during a new iteration of the loop.

In the development and observation step 68, at least one failure detection parameter CUMUC, DVAIC is developed and observed by the development and observation assembly 50.

In the example shown in FIG. 4, a first failure detection parameter CUMUC is obtained by directly using the value of the second intermediate parameter CUMUC representative of the accumulation of the deviations between the short-term anemo-inertial speed VAICT and the measured anemometric speed Vc or the measured airspeed Va.

This parameter is thus representative of inconsistencies that may exist between the horizontal acceleration AccX measured using a sensor 33 of the inertial unit 14, and the anemometric speed, measured using sensors 20, 22 and optionally 23 of the measuring assembly 16.

In one alternative, the first failure detection parameter is computed similarly to the second intermediate parameter CUMUC by accumulating information representative of the deviations between the short-term anemo-inertial speed VAICT and the measured anemometric speed Vc or the measured airspeed Va.

However, to limit the measuring anomalies that for example result from an accumulation of deviations which result from the accumulation of the same source of error during small, but numerous low-amplitude altitude variations during leveling off, the first failure detection parameter is designed to decrease, or to be reset to zero, when the flight is stable and when no anomaly has been detected.

In one example, the value of the failure detection parameter is computed similarly to that of the second intermediate parameter CUMUC, by successively accumulating the values of the difference DVCT between the time-compensated short-term anemo-inertial speed and the anemometric speed Vc.

However, unlike the second intermediate parameter CUMUC, the first failure detection parameter is decreased, and is advantageously reset to zero when at least one absence of anomaly detection condition is obtained for a predetermined time interval T. This absence is for example characterized by an accumulation gain K1 below a given threshold value during the time T.

Furthermore, a second failure detection parameter DVAIC is also developed and observed by the assembly 50.

In the example shown in FIG. 4, the second failure detection parameter DVAIC is equal to the third intermediate parameter DVAIC.

This parameter is representative of the coherence between the inertial measurements obtained from the sensor 33 and the outside measurements obtained from a sensor 20 to 23

Next, during step 68, a failure detection is done based on the failure detection parameters CUMUC, DVAIC observed in step 66.

In one particular embodiment, each of the failure detection parameters CUMUC, DVAIC is compared to a given predetermined threshold.

When the value of the failure detection parameter CUMUC, DVAIC is below the predetermined threshold value associated with that parameter, no failure is detected.

When the value of the failure detection parameter CUMUC, DVAIC is above the predetermined threshold value associated with that parameter, a failure is detected.

When a failure is detected, an alarm is activated in step 70. This alarm is connected to an inertial sensor 33 and/or one or more of the sensors 20, to 23, without targeting one sensor in particular. However, the pilot is asked to verify the base parameters, by comparison with an independent instrument or by observation of the environment.

In one advantageous alternative, an anomaly detector is placed on the static pressure sensor 20, which makes it possible to discriminate the defective sensor 20, 22 in the anemometric part.

In still another alternative, the horizontal acceleration sensors 33 of the system 10 are independent of the inertial unit 14. The system 10 does not, in that case, comprise the inertial unit 14, but only a computer 34 similar to that described above.

Figure 10:
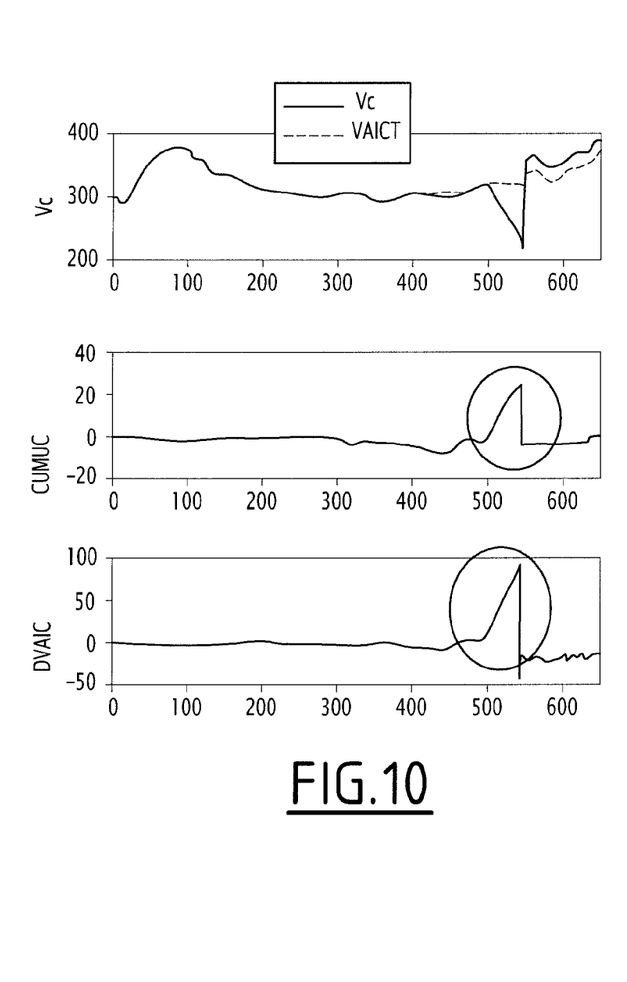
FIG. 10 shows graphs of the speed, and of failure detection parameters computed in the method according to the embodiment of the invention, during a total pressure blockage during descent.

One example embodiment of the method according to the invention during a descent phase of the aircraft 12 is illustrated by FIG. 10.

During that phase, and until approximately 500 seconds, the total pressure measurement sensor 22 works correctly, as do the other sensors 33, 20, 23.

Each of the failure detection parameters CUMUC, DVAIC has a substantially zero value. No failure is detected.

Around 500 seconds, the total pressure sensor 22 becomes plugged. This immediately results in erroneous signals regarding the short-term anemo-inertial speed VAICT and the conventional speed Vc.

As illustrated by the curves in FIG. 10, the values of the failure detection parameters CUMUC and DVAIC increase and cross the detection threshold. The failure is detected quasi-immediately.

Figure 11:
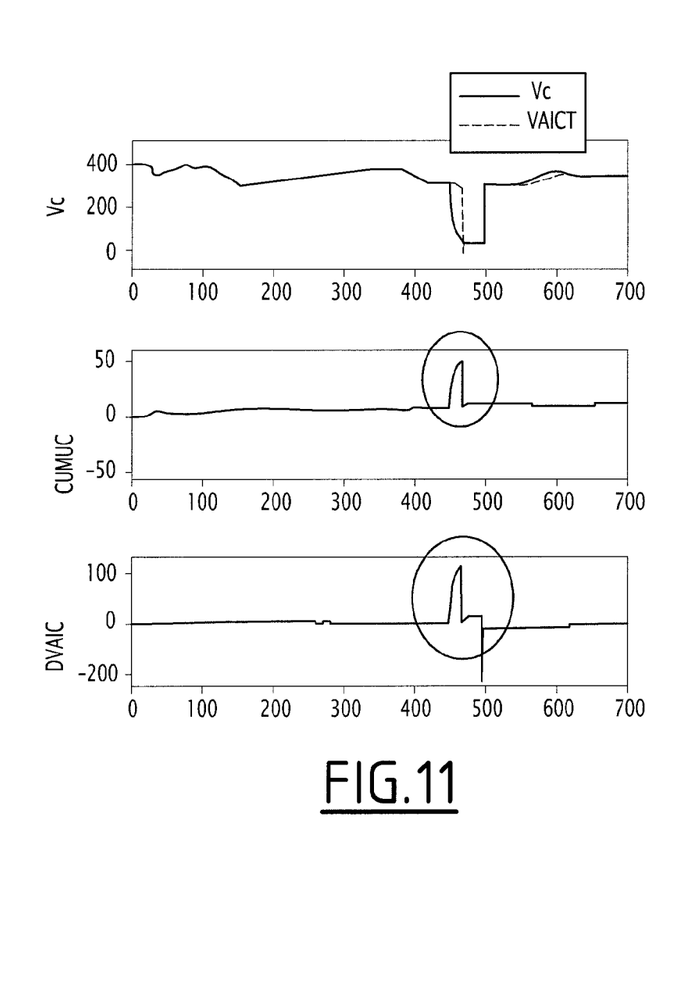
FIG. 11 is a view similar to FIG. 10, for total pressure defect tending toward the static pressure during level flight.

In the example of FIG. 11, the aircraft 12 is flying substantially level. Until a time equal to approximately 450 seconds, the total pressure sensor 22 works normally. The value of each failure detection parameter CUMUC, DVAIC is substantially zero. No failure is detected.

From the time equal to 450 seconds, the value of the total pressure measured by the sensor 22 tends toward the value of the static pressure measured by the sensor 20. This immediately disrupts the short-term anemo-inertial speed VAICT and the conventional speed Vc.

As illustrated by the curves in FIG. 11, the value of the failure detection parameters CUMUC, DVAIC increases immediately and cross their detection threshold. The failure is detected quasi-immediately.

The detection system 10 according to this embodiment of the invention, and the method implemented using the system 10, therefore allow very quick and reliable detection of the failure occurring on the horizontal path of the aircraft, for example at a horizontal accelerometer or an associated anemometric sensor, such as a total or static pressure sensor.

The method is particularly simple to implement, since it implements a new anemo-inertial loop based on the measurement of a horizontal acceleration AccX and it advantageously uses intermediate parameters DVCT, CUMUC, DVAIC present in the anemo-inertial loop, which surprisingly allow the detection of failures.

None of the intermediate parameters DVCT, CUMUC, DVAIC of the anemo-inertial loop used to develop the failure detection parameters CUMUC, DVAIC are normally sent to the computers of the display systems 17 or the control and piloting systems 19 of the aircraft 12.

The embodiment of invention described above shows that surprisingly, the anemo-inertial loop implemented and the intermediate parameters resulting from the loop are a very useful basis for creating failure detection parameters that detect a failure on a horizontal path sensor precisely and quasi-immediately.

What is claimed is:

1. A method for detecting a failure of at least one sensor on board an aircraft comprising:
   measuring a horizontal acceleration;
   measuring an anemometric speed or an airspeed;
   implementing an anemo-inertial loop in a computer, the anemo-inertial loop comprising:
      obtaining a computed horizontal speed, based on an integration of the measured horizontal acceleration and obtaining a short-term anemo-inertial speed from the computed horizontal speed;
      developing at least one intermediate loop parameter based on a deviation between the short-term anemo-inertial speed and the anemometric speed or the airspeed; and
      looping on the measured horizontal acceleration, before integration, according to the value of at least one intermediate parameter;
   observing at least one failure detection parameter obtained from the at least one intermediate loop parameters of the anemo-inertial loop; and
   determining the presence of a failure on one of the sensors of the aircraft based on the value of the observed failure detection parameter.

2. The method as recited in claim 1 wherein the determining includes comparing the value of the observed failure detection parameter and a given predetermined threshold.

3. The method as recited in claim 1 wherein the anemo-inertial loop includes computing a first intermediate parameter representative of the difference between the short-term anemo-inertial speed and the anemometric speed or the airspeed, and computing a second intermediate parameter representative of an accumulation of a deviation between the short-term anemo-inertial altitude and the anemometric speed or the airspeed over several iterations of the anemo-inertial loop.

4. The method as recited in claim 3 wherein the anemo-inertial loop includes determining an accumulation gain of each difference between the short-term anemo-inertial speed and the anemometric speed or the airspeed, the second intermediate parameter being computed based on the accumulation gain.

5. The method as recited in claim 4 wherein the accumulation gain is a variable gain over time, the accumulation gain being computed based on the measured horizontal acceleration by the horizontal acceleration sensor and/or a vertical speed obtained by integrating a measured vertical acceleration by the vertical acceleration sensor.

6. The method as recited in claim 3 wherein the anemo-inertial loop includes determining a first failure detection parameter from an accumulation of the difference between the short-term anemo-inertial speed and the anemometric speed or the airspeed over several iterations of the loop.

7. The method as recited in claim 6 wherein the determination of the first failure detection parameter includes a decrease in the accumulation, when at least one condition for lack of anomaly detection is obtained for a given time interval.

8. The method as recited in claim 3 wherein the anemo-inertial loop includes determining a third intermediate parameter, representative of the difference between the short-term anemo-inertial speed and the anemometric speed or the airspeed, the difference being corrected with the second intermediate parameter.

9. The method as recited in claim 8 wherein a second failure detection parameter is determined from the third intermediate parameter.

10. The method as recited in claim 8 wherein the looping sub-step comprises correcting the horizontal acceleration before integration by at least one base correction value to obtain the computed horizontal speed after integration, the at least one base correction value depending on the third intermediate parameter and at least one base correction gain variable over time.

11. The method as recited in claim 10 wherein the base correction gain decreases during a horizontal acceleration or deceleration phase of the aircraft.

12. The method as recited in claim 10 wherein the correcting the horizontal acceleration includes weighting the measured horizontal acceleration by a variable weight gain.

13. The method as recited in claim 1 wherein the anemo-inertial loop includes a sub-step of correcting the computed horizontal speed based on an instantaneous altitude to obtain the short-term anemo-inertial speed.

14. The method as recited in claim 13 wherein the sub-step of correcting the computed horizontal speed includes developing an intermediate correction parameter as a function of the instantaneous altitude.

15. The method as recited in claim 1 wherein the anemo-inertial loop includes a sub-step of time compensating the short-term anemo-inertial speed obtained after integration, a first intermediate parameter representative of a deviation between the short-term anemo-inertial speed and the anemometric speed or airspeed being obtained from the difference between the time-compensated short-term anemo-inertial speed and the anemometric speed or the airspeed.

16. The method as recited in claim 1 further comprising activating an alarm when the presence of a failure is detected in the step for determining the presence of a failure.

17. A system for detecting a failure of at least one sensor on board an aircraft comprising:
- a first measurement assembly configured to measure components of a horizontal acceleration;
- a second measurement assembly configured to measure an anemometric speed or an airspeed;
- a computer including an implementation assembly configured to implement an anemo-inertial loop including, the implementation assembly comprising:
  - a computation module configured to obtain a computed horizontal speed based on an integration of the horizontal acceleration measured by the first measurement assembly, the computation module configured to obtain a short-term anemo-inertial speed obtained from the computed horizontal speed;
  - a development module configured to develop at least one intermediate loop parameter based on a deviation between the short-term anemo-inertial speed and the anemometric speed or the airspeed; and
  - a looping module for looping on the measured horizontal acceleration, before integration, based on the value of at least one intermediate parameter;
- an observation assembly for observing at least one failure detection parameter obtained from the at least one an intermediate parameter of the anemo-inertial loop;
- a determination assembly configured to determine the presence of a failure on one of the sensors of the aircraft based on the value of the observed failure detection parameter.

* * * * *